(12) United States Patent
Laurent et al.

(10) Patent No.: US 7,740,989 B2
(45) Date of Patent: Jun. 22, 2010

(54) MICRO FUEL CELL WITH AN ELECTROLYTIC MEMBRANE REINFORCED BY AN ANCHORING ELEMENT AND METHOD FOR PRODUCTION OF A MICRO FUEL CELL

(75) Inventors: Jean-Yves Laurent, Domene (FR); Frederic Gaillard, Voiron (FR); Karine Lambert, Saint Julien de Ratz (FR); Marc Plissonnier, Eybens (FR)

(73) Assignee: Commissariat a l'Energie Atomique, Paris (FR)

( * ) Notice: Subject to any disclaimer, the term of this patent is extended or adjusted under 35 U.S.C. 154(b) by 943 days.

(21) Appl. No.: 11/509,645

(22) Filed: Aug. 25, 2006

(65) Prior Publication Data

US 2007/0054171 A1    Mar. 8, 2007

(30) Foreign Application Priority Data

Sep. 8, 2005    (FR)    ................................. 05 09192

(51) Int. Cl.
*H01M 2/08*    (2006.01)
(52) U.S. Cl. .................. 429/508; 429/507; 429/510; 429/115
(58) Field of Classification Search ............ 429/35, 429/36, 34; 427/115
See application file for complete search history.

(56) References Cited

U.S. PATENT DOCUMENTS 6,338,492 B1 *    1/2002    Schilling et al. ............ 277/630
7,223,491 B2 *    5/2007    McLean et al. ............... 429/30
2001/0040250 A1    11/2001    Charrier et al.

FOREIGN PATENT DOCUMENTS

| FR | 2 859 201 A | 3/2005 |
|---|---|---|
| WO | WO 2005/023698 A1 | 3/2005 |
| WO | WO 2005/079466 A2 | 9/2005 |

OTHER PUBLICATIONS

Keyur Shah et al., "Novel microfabrication approaches for directly patterning PEM fuel cell membranes," Mar. 2003. Stevens Institute of Technology, Castle Point on Hudson, Hoboken, NJ 07030, USA.

* cited by examiner

*Primary Examiner*—Patrick Ryan
*Assistant Examiner*—Julian Mercado
(74) *Attorney, Agent, or Firm*—Oliff & Berridge, PLC

(57) ABSTRACT

A micro fuel cell comprises at least a substrate provided with front and rear faces. The front face of the substrate supports a successive stacking of a first electrode, a substantially flat electrolytic membrane and a second electrode. The electrolytic membrane comprises at least one anchoring element salient substantially perpendicularly to a main plane of said membrane. The anchoring element is arranged in a complementary part of an anchoring recess formed in the substrate. The substrate can also comprise a plurality of microchannels, substantially perpendicular to the main plane of the membrane. The anchoring recess can then be formed by one of the microchannels whereas the other microchannels enable supply of the first electrode with reactive fluid. Such a micro fuel cell is able to operate when a pressure difference exists between the two sides of the stacking.

10 Claims, 2 Drawing Sheets

MICRO FUEL CELL WITH AN ELECTROLYTIC MEMBRANE REINFORCED BY AN ANCHORING ELEMENT AND METHOD FOR PRODUCTION OF A MICRO FUEL CELL

BACKGROUND OF THE INVENTION

The invention relates to a micro fuel cell comprising at least:
- a substrate provided with front and rear faces
- and a successive stacking of a first electrode, a substantially flat electrolytic membrane and a second electrode, said stacking being supported by the front face of the substrate.

The invention also relates to a method for production of a micro fuel cell.

STATE OF THE ART

In the field of fuel cells, two categories of cells currently exist. The first category concerns cells called filter press type stacking, such as Proton Exchange Membrane Fuel Cells (PEMFC). These cells generally comprise a large number of elemental cells arranged in series. Each cell comprises a stacking comprising an anode and a cathode separated by an electrolytic membrane. The stacking, generally called an "EME" (Electrode-Membrane-Electrode) stack, is arranged between two current collecting plates. The set of elemental cells forms a filter-press type assembly, with clamping plates bolted onto each side of a series of EME stacks.

For example, as illustrated in FIG. 1, a fuel cell comprises an EME stack comprising an electrolytic membrane 1 provided with front and rear faces 1a and 1b. The front and rear faces 1a and 1b are respectively and successively covered by first and second catalytic layers 2a and 3a and diffusion layers 2b and 3b. The first catalytic layer 2a and the first diffusion layer 2b form the anode 2 whereas the second catalytic layer 3a and the second diffusion layer 3b form the cathode 3. First and second collectors 4 and 5 are respectively arranged on the external faces of the first and second diffusion layers 2b and 3b. They are integrated in the EME stack, i.e. the EME stack and the first and second current collectors 4 and 5 form a single elemental cell. They are each formed by a metallic deposition comprising a plurality of transverse passages 4a and 5a designed to allow a fluid to pass to a diffusion layer. Thus, the hydrogen that is generally used as fuel can pass through the transverse passages 4a of the anodic current collector 4 to reach the diffusion layer 2b of the anode 2. The oxygen generally used as fuel passes through the transverse passages 5a of the cathodic current collector 5 to reach the diffusion layer 3b of the cathode 3. Likewise, the water produced in the course of operation of the fuel cell is removed via the same transverse passages 5a.

With this first category of fuel cells, supplying the electrodes with reactive fluid and removing the products formed when the cell operates can represent major difficulties, in particular in the portable equipment field. Miniaturization of fuel cells in fact means that the storage means and fluid circulation circuits have to be achieved in small volumes. Fuel cells achieved by filter-press type stacking are however limited in terms of miniaturization.

Thus, for a few years now certain people have proposed producing miniature fuel cells using microtechnology-based techniques and more particularly by deposition and patterning of thin layers on a substrate. This second category of fuel cells, also called planar micro fuel cells, enables the volume of the supply circuits and possibly of storage of the reactive fluids and of the products formed to be reduced. In general manner, the electrode supply circuits are in the form of supply cavities or microchannels formed in the substrate, possibly with microporous diffusion layers conveying the fluids to the electrodes or to the electrolytic membrane. For example, fabrication of a micro fuel cell comprising a plurality of supply microchannels formed in a silicon or polydimethylsiloxane (PDMS) substrate is described in the article "Novel microfabrication approaches for directly patterning PEM fuel cell membranes" by K. Shah et al (Journal of Power Sources, 123 (2003), 172-181). The anode, the electrolytic membrane and the cathode are in the form of thin layers successively deposited on a substrate comprising supply microchannels.

FIG. 2 represents, for illustration purposes, a micro fuel cell according to the prior art comprising a substrate 6 supporting an anode 8, an electrolytic membrane 9 and a cathode 10. A cathodic current collector 11 is arranged on the cathode 10 and circulation of the fuel oxidizer is tangential to the cathode 10. Supply of fuel to the anode 8 is performed by means of circulation channels 7 formed vertically in the substrate 6. The circulation channels 7 therefore enable the fuel to be transported from a fuel source (not represented) to a microporous diffusion layer 12 arranged between the anode 8 and a current collector 13.

Micro fuel cells, achieved in a substrate, with porous supports and/or supply microchannels are not however suitable when a pressure difference exists between the two sides of the electrolytic membrane. This pressure difference can in fact cause destruction of the micro fuel cell or make one or more thin layers arranged on the substrate come unstuck. This pressure difference occurs more particularly in miniaturized fuel cells where the volumes are small, as control of the fuel pressure is not perfectly mastered in this case.

OBJECT OF THE INVENTION

It is an object of the invention to provide a micro fuel cell remedying the shortcomings of the prior art.

More particularly, the object of the invention is to provide a micro fuel cell that is able to operate when a pressure difference exists between the two sides of the EME stack, without any risk of unsticking or destruction.

According to the invention, this object is achieved by the fact that a micro fuel cell comprising at least:
- a substrate equipped with front and rear faces
- a successive stacking of a first electrode, a substantially flat electrolytic membrane and a second electrode, said stacking being supported by the front face of the substrate, is characterized in that the electrolytic membrane comprises at least one anchoring element salient substantially perpendicularly to the plane of said membrane and arranged in a complementary part of an anchoring recess formed in the substrate.

More particularly, the substrate comprises a plurality of microchannels, substantially perpendicular to the plane of the membrane and each comprising first and second openings respectively in the front and rear faces of the substrate.

According to a first development of the invention, the anchoring recess is one of the microchannels, the other microchannels being designed for supply of reactive fluid.

According to a second development of the invention, the anchoring recess comprises at least one narrow passage for the anchoring recess, which passage opens out onto a broadened cavity.

It is a further object of the invention to provide a method for production of a micro fuel cell according to the first development of the invention that is easy to implement and inexpensive.

According to the invention, this object is achieved by the fact that it comprises at least the following successive stages:
- formation of the plurality of microchannels in the substrate,
- formation of the first electrode on the front face of the substrate, between the microchannels,
- selection, among the microchannels, of a microchannel designed to form the anchoring recess,
- deposition of a photosensitive thin film enabling the second opening of the non-selected microchannels to be sealed off,
- spreading, on the front face of the substrate equipped with the first electrode, of a thin layer of electrolytic solution so as to form the substantially flat electrolytic membrane, after drying, with the anchoring element salient substantially perpendicularly to the plane of said membrane and filling at least a complementary part of the anchoring recess,
- and formation of the second electrode on the substantially flat free face of the electrolytic membrane.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 1:
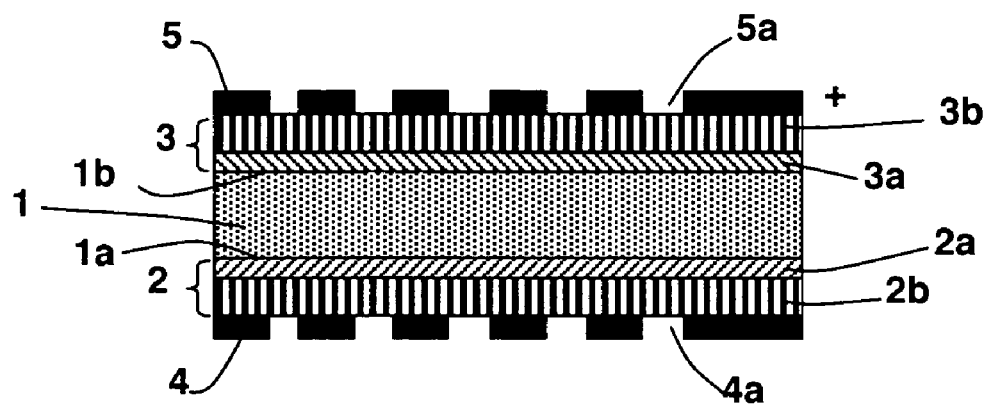
FIG. 1 represents, in cross-section, an elemental stack of a filter-press type fuel cell according to the prior art.
Figure 2:
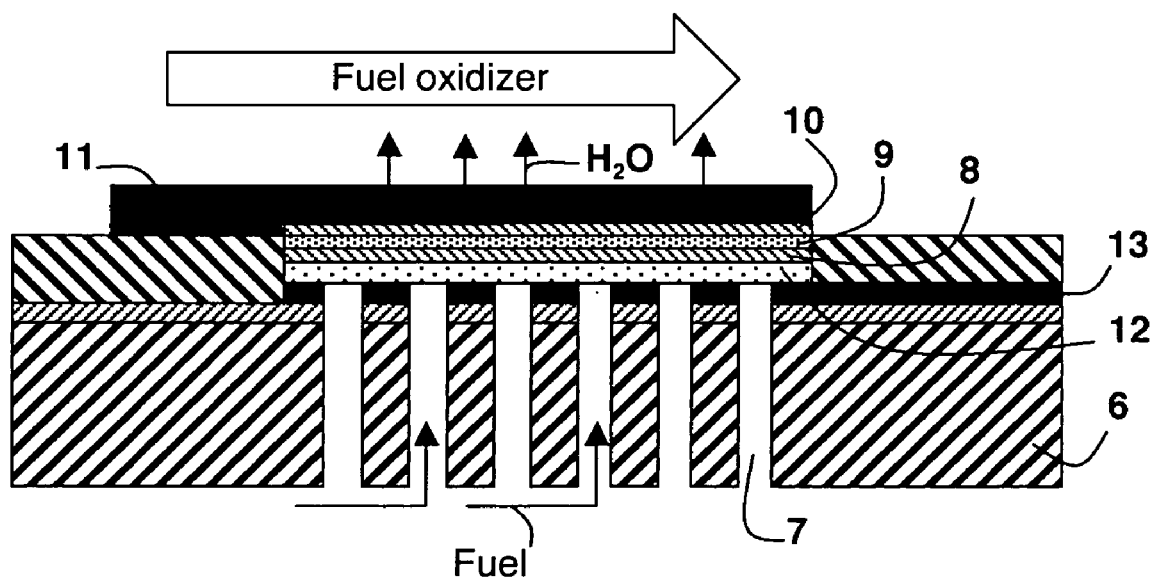
FIG. 2 represents, in cross-section, a planar type micro fuel cell according to the prior art.
Figure 3:
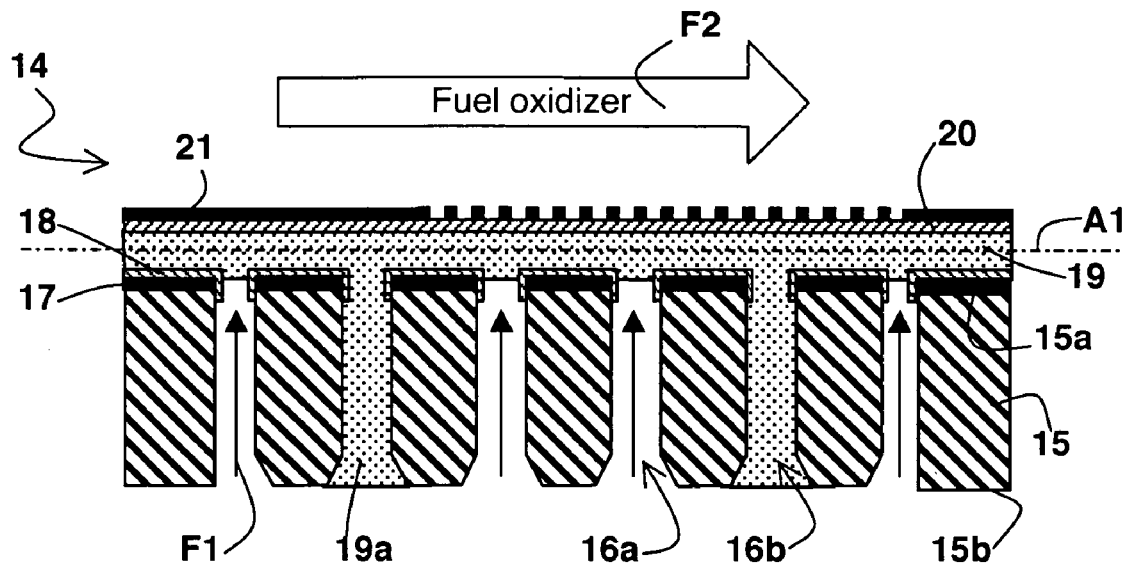
FIG. 3 represents, schematically and in cross-section, a particular embodiment of a micro fuel cell according to the invention.
Figure 4:
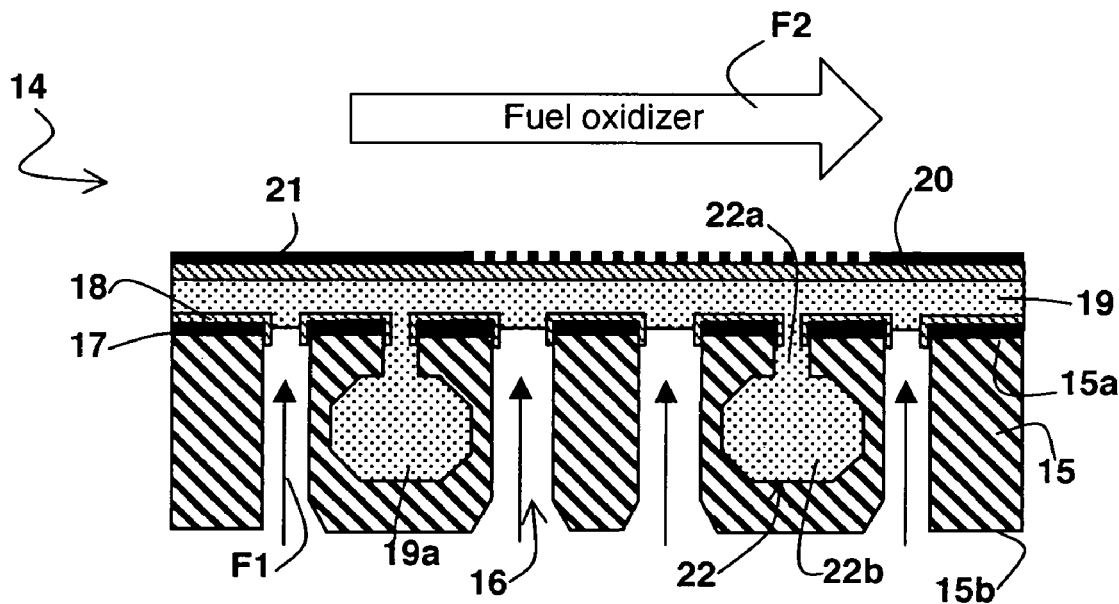
FIG. 4 represents, schematically and in cross-section, an alternative embodiment of the micro fuel cell according to FIG. 3.

According to particular embodiments represented in FIGS. 3 and 4, a micro fuel cell 14 comprises a substrate 15 equipped with a front face 15a and a rear face 15b that are preferably substantially flat. The substrate 15, for example made of silicon, plastic or ceramic, comprises a plurality of microchannels 16 substantially perpendicular to the plane of the front face 15a of the substrate. Thus, six microchannels are represented in FIG. 3 and four microchannels 16 are represented in FIG. 4, each with first and second openings respectively in the front face 15a and the rear face 15b of the substrate 15. The microchannels 16 thus pass through the whole thickness of the substrate 15.

In the particular embodiment represented in FIG. 3 and as indicated hereafter, the six microchannels are respectively formed by four microchannels 16a designed for fluid supply and two microchannels 16b designed to act as anchoring recesses. In addition, a first current collector 17 is preferably arranged on the front face 15a of the substrate 15 and it is drilled or cut in such a way as to comprise openings at the level of the microchannels 16a and 16b. The first current collector 17 and the shape of the substrate 15 in particular enable continuity of current flow in the first current collector to be ensured. For example, the first current collector 17 can be in the form of a grid provided with openings respectively arranged facing first openings of the microchannels 16a and 16b.

The first current collector 17 is covered by a plurality of catalytic elements 18. More particularly, the whole of the free surface of the first current collector 17 is covered by said catalytic elements 18 that are separated from one another by the microchannels 16a and 16b. The catalytic elements then form the first electrode of the micro fuel cell 14, for example an anode.

The front face 15a of the substrate 15, equipped with the first current collector 17 and with the catalytic elements 18, successively supports a substantially flat electrolytic membrane 19, a second electrode 20 and a second current collector 21. The second electrode 20 and the second current collector 21 are for example in the form of substantially flat thin layers. The second current collector 21 can be partially discontinuous.

What is meant by substantially flat electrolytic membrane is a thin layer having front and rear faces that are substantially flat. Moreover, on account of the small thickness of the electrolytic membrane, a main plane can be defined, that is parallel to the respective planes of the front and rear faces of the electrolytic membrane. Thus, in FIG. 3, the main plane of the electrolytic membrane 19 is represented by a dashed line noted A1, and it is parallel to the plane of the front face 15a of the substrate 15.

The successive stacking formed by the first electrode 18, the electrolytic membrane 19 and the second electrode 20 is moreover mechanically fixed to the substrate 15. This fixing is performed by at least one anchoring element 19a belonging to the electrolytic membrane 19. In FIG. 3, the electrolytic membrane 19 in fact comprises two anchoring elements 19a salient substantially perpendicularly to the main plane A1 of said membrane 19 and each occupying a microchannel 16b. Each microchannel 16b occupied by an anchoring element 19a then acts as anchoring recess for said anchoring element 19a. An anchoring element 19a is then arranged in a complementary part of the anchoring recess that is associated therewith.

The other four microchannels 16a are used to supply the micro fuel cell, and more particularly the first electrode 18, with reactive fluid. The reactive fluid is for example a fuel when the first electrode 18 is an anode. Circulation of a reactive fluid in the microchannels 16a not occupied by an anchoring element 19a is represented in FIG. 3 by an arrow F1 pointing upwards, i.e. from the second opening of a microchannel 16a in the direction of the first opening. Each of the second openings of the microchannels 16a can be connected to a reactive fluid source, such as a storage tank. In addition, supply of the second electrode 20 with reactive fluid, for example a fuel oxidizer, can be performed by any type of means. This supply is for example performed by means of a supply channel (not represented) arranged above the stack and substantially parallel to the plane of the second electrode. Supply of the second electrode 19 with fuel oxidizer is represented, in FIG. 3, by the arrow F2 substantially parallel to the second electrode 20.

The microchannels 16a and 16b can be of variable dimensions. For example, they have a diameter of about 50 micrometers and the distance separating two adjacent microchannels is 30 micrometers. In this case, 10% of the microchannels are preferably used as anchoring recesses to accommodate the anchoring elements of the electrolytic membrane 19. In addition, the shape and size of the microchannels 16a and 16b can be adapted so as to enable a better fixing of the electrolytic membrane 19 to the substrate 15. Thus, as represented in FIG. 3, the walls delineating a microchannel 16b can form a tapered zone, at the bottom part thereof, opening out into the second opening of said microchannel 16b.

For example, the micro fuel cell represented in FIG. 3 is obtained by previously forming the plurality of microchannels 16a and 16b in the substrate 15. For a silicon substrate 15, this operation can be performed by Reactive Ion Etching (RIE), producing microchannels 16a and 16b of small diameter, for example about 30 micrometers, with a distance between two microchannels 16a and 16b for example of about 80 micrometers. Additional etching is then performed to achieve the tapered zone of the bottom part of each microchannel and to thus facilitate anchoring of the anchoring elements 19a in the microchannels 16b.

Then the first current collector and the first electrode are successively formed on the front face 15a of the substrate 15, between the microchannels 16. The current collecting elements 17 are for example formed by physical vapor deposition (PVD) of a thin layer of gold. The catalytic elements 18 of the first electrode are more particularly achieved by means of carbon nanotubes formed on the current collecting elements 17 previously covered with growth promoter and designed to act as catalyst support. The catalyst is for example deposited on the carbon nanotubes by electrodeposition.

Among the microchannels 16a and 16b formed in the substrate 15, one or more microchannels 16b are selected to form one or more anchoring recesses. Two microchannels 16b have for example been chosen for the micro fuel cell represented in FIG. 3. A photosensitive thin film is then deposited on the rear face 15b of the substrate 15 so as to seal off the second opening of the non-selected microchannels 16a. The thin film thus enables a volume of air to be trapped in the non-selected microchannels 16a. An electrolytic solution is then spread, for example by spin coating, on the front face 15a of the substrate 15, covered by the first current collector and the first electrode. The electrolytic solution then fills the selected microchannels 16b whereas the volume of air contained in the other microchannels 16a prevents said microchannels 16a from being filled with the electrolytic solution. Once it has been dried, the electrolytic solution enables the two anchoring elements 19a and a substantially flat thin layer to be formed. The two anchoring elements occupy the selected microchannels 16b and the thin layer is supported by the front face 15a of the substrate 15, the assembly forming the electrolytic membrane 19 which can be a perfluorosulfonate-based ionomer membrane, such as Nafion®.

The second electrode 20, for example made of platinum-plated carbon, is then formed on the front face of the electrolytic membrane by spray coating, and the second current collector 21 can then be deposited on the free surface of the second electrode 20 by PVD.

Such a micro fuel cell 14 is particularly suitable for operating when a pressure difference exists between the two sides of the Electrode-Membrane-Electrode (EME) stack. Indeed, the anchoring element(s) of the electrolytic membrane perform(s) mechanical fixing enabling problems of destruction of the micro fuel cell or of unsticking of the stack, or of at least an element of this stack, to be avoided. Furthermore, this mechanical fixing is easy to perform and inexpensive. It does not require any new material being incorporated into the micro fuel cell, since the material used to form the anchoring element(s) is constituted by the electrolytic solution designed to form the membrane in the stack. Finally, the volume of the micro fuel cell is not increased by this fixing method and the weight increase of the micro fuel cell is negligible.

Producing such a micro fuel cell also presents the advantage of being able to adjust or control the number of anchoring recesses according to the pressure difference liable to occur between the two sides of the stacking. It is also possible to control the ratio between the surface fixed by the anchoring elements and the surface under pressure and also to control the arrangement of the anchoring elements. As the adherence between the different elements of the micro fuel cell is dependent on the materials used, this adherence can be measured beforehand so as to estimate the anchoring force required and thus be able to choose the number, shape and arrangement of the anchoring elements to be formed when the micro fuel cell is constructed.

A microchannel 16b used to receive an anchoring element 19a of the electrolytic membrane 19 can be replaced by any type of recess formed in the substrate 15. Thus, in the alternative embodiment represented in FIG. 4, the two microchannels 16b occupied by the anchoring elements 19a, in the micro fuel cell 14 according to FIG. 3, are replaced by two closed recesses 22 formed in the substrate 15. Each recess 22 preferably comprises a narrow passage 22a for the corresponding anchoring element 19a and this narrow passage 22a opens out into a closed broader cavity 22b. In FIG. 4, the two anchoring elements 19a of the electrolytic membrane 19 occupy the whole of the volume of the corresponding recesses 22. The volume of the recesses 22 can be only partially filled by the anchoring elements 19a, the latter elements however having a complementary shape to at least a part of the recess 22 so as to ensure satisfactory anchoring of the membrane 19 to the substrate 15.

In FIG. 4, four microchannels 16 designed to supply the first electrode 18 with reactive fluid and, more particularly with fuel oxidizer, are arranged in the substrate 15, substantially perpendicularly to the plane of the electrolytic membrane 19. Thus, in FIG. 4, each recess 22 is surrounded by two microchannels 16. The current collecting elements 17 forming the first collector and supporting the catalytic elements 18 of the first electrode are then separated from one another by the microchannels 16 and the narrow passages 22a of the two recesses 22.

Such a micro fuel cell is for example obtained by previously forming the four microchannels 16 and the two recesses 22 in the substrate 15, for example by RIE. Then the first current collector 17 and the first electrode 18 are successively formed on the front face 15a of the substrate 15. They can be formed as described previously. Then the electrolytic solution designed to form the electrolytic membrane 19, with its anchoring elements 19a, is spreaded on the front face 15a of the substrate 15, covered by the first current collector and the first electrode. The electrolytic solution then fills the microchannels 16 and the recesses 22. The microchannels 16 are then freed by blowing, from the rear face 15b of the substrate. After the electrolytic solution has been dried, the other elements of the micro fuel cell, such as the second electrode 20 and the second current collector, are then formed as described previously.

The invention is not limited to the embodiments described above. Thus, in other embodiments, reactive fluid supply could be performed by any other type of means, the microchannels serving the purpose of supplying with fuel oxidizer being able for example to be replaced by a porous substrate provided with at least one anchoring recess.

The invention claimed is:

1. Micro fuel cell comprising at least:

a substrate provided with front and rear faces and a successive stacking of a first electrode, a substantially flat electrolytic membrane and a second electrode, successively stacked from the front face of the substrate, wherein the electrolytic membrane comprises at least one anchoring element protruding substantially perpendicularly from a main plane of said membrane and arranged in a complementary part of an anchoring recess formed in the substrate.

2. Micro fuel cell according to claim 1, wherein the anchoring element occupies the whole of a volume delimited by the anchoring recess.

3. Micro fuel cell according to claim 1, wherein the substrate comprises a plurality of microchannels substantially perpendicular to the main plane of the membrane and each comprising first and second openings, respectively in the front and rear faces of the substrate.

4. Micro fuel cell according to claim 3, wherein the first electrode is formed by a plurality of distinct catalytic elements separated by the microchannels and arranged on the front face of the substrate.

5. Micro fuel cell according to claim 4, further comprising first and second current collectors respectively arranged between the catalytic elements of the first electrode and the front face of the substrate and on a free surface of the second electrode.

6. Micro fuel cell according to claim 3, wherein the anchoring recess is one of the microchannels, the other microchannels being structured to perform supply of reactive fluid.

7. Micro fuel cell according to claim 1, wherein the anchoring recess comprises at least one narrow passage for the anchoring element opening out onto a broader cavity.

8. Micro fuel cell according to claim 1, wherein the substrate is a porous substrate comprising at least one anchoring recess.

9. Micro fuel cell according to claim 1, wherein the successive stacking is mechanically fixed to the substrate by the anchoring element.

10. Method for production of a micro fuel cell according to claim 6, comprising at least the following successive steps:
   formation of the plurality of microchannels in the substrate,
   formation of the first electrode on the front face of the substrate, between the microchannels,
   selection, among the microchannels, of a microchannel designed to form the anchoring recess,
   deposition of a photosensitive thin film enabling the second opening of the non-selected microchannels to be sealed off,
   spreading, on the front face of the substrate equipped with the first electrode, of a thin layer of electrolytic solution so as to form the substantially flat electrolytic membrane, after drying, with the anchoring element salient substantially perpendicularly to the plane of said membrane and filling at least a complementary part of the anchoring recess,
   and formation of the second electrode on the substantially flat free face of the electrolytic membrane.

* * * * *